(12) United States Patent  
Welch

(10) Patent No.: US 7,500,491 B2
(45) Date of Patent: Mar. 10, 2009

(54) SANITARY FLUID PRESSURE CONTROL VALVE

(75) Inventor: Elmer Scott Welch, Silver Lake, WI (US)

(73) Assignee: V. Q. Corp., Silver Lake, WI (US)

( * ) Notice: Subject to any disclaimer, the term of this patent is extended or adjusted under 35 U.S.C. 154(b) by 0 days.

(21) Appl. No.: 11/786,360

(22) Filed: Apr. 11, 2007

(65) Prior Publication Data

US 2007/0251584 A1  Nov. 1, 2007

Related U.S. Application Data

(60) Provisional application No. 60/791,725, filed on Apr. 13, 2006.

(51) Int. Cl.
*G05D 16/08* (2006.01)
(52) U.S. Cl. .................. 137/505.41; 137/508
(58) Field of Classification Search ........... 137/505.38, 137/505.41, 505.27, 508, 504, 505.39, 906; 251/121, 122
See application file for complete search history.

(56) References Cited

U.S. PATENT DOCUMENTS

| | | | | | |
|---|---|---|---|---|---|
| 151,210 A | * | 5/1874 | Edwards | ................ | 137/505.41 |
| 643,519 A | * | 2/1900 | Miller | .................... | 137/505.38 |
| 1,069,188 A | * | 8/1913 | Saefke | .................... | 138/505.38 |
| 1,300,182 A | * | 4/1919 | McClellan | ............. | 137/505.38 |
| 2,587,728 A | * | 3/1952 | Hoskins | ................. | 137/505.35 |
| 2,899,973 A | * | 8/1959 | Carlson | ................. | 137/505.41 |
| 4,693,450 A | * | 9/1987 | Paetzel | ....................... | 251/121 |
| 4,915,127 A | * | 4/1990 | Werley | .................. | 137/505.42 |
| 4,976,404 A | * | 12/1990 | Ichikawa et al. | ............ | 251/121 |
| 5,524,670 A | * | 6/1996 | Castle | ........................ | 137/504 |

\* cited by examiner

*Primary Examiner*—Stephen M Hepperle
(74) *Attorney, Agent, or Firm*—Wood, Phillips, Katz, Clark & Mortimer

(57) ABSTRACT

A sanitary fluid pressure control valve, including a valve body having an input side and a discharge side with a restricted chamber therebetween, and a reciprocable plug extending through the restricted chamber with one plug end on the input side and the other plug end on the discharge side. A diaphragm is secured to the one plug end, and defines a pressure chamber adjacent the discharge side. A fluid passage in the plug extends through the restricted chamber, and has an outlet adjacent the diaphragm and an inlet spaced from the plug other end. The pressure in the pressure chamber relative to the pressure in the discharge side substantially controls the position of the plug. In a first plug position, the fluid passage inlet is substantially blocked in the restricted chamber. The plug is reciprocable from the first position to fluid flow positions in which the fluid passage inlet is variously exposed on the input side.

4 Claims, 4 Drawing Sheets

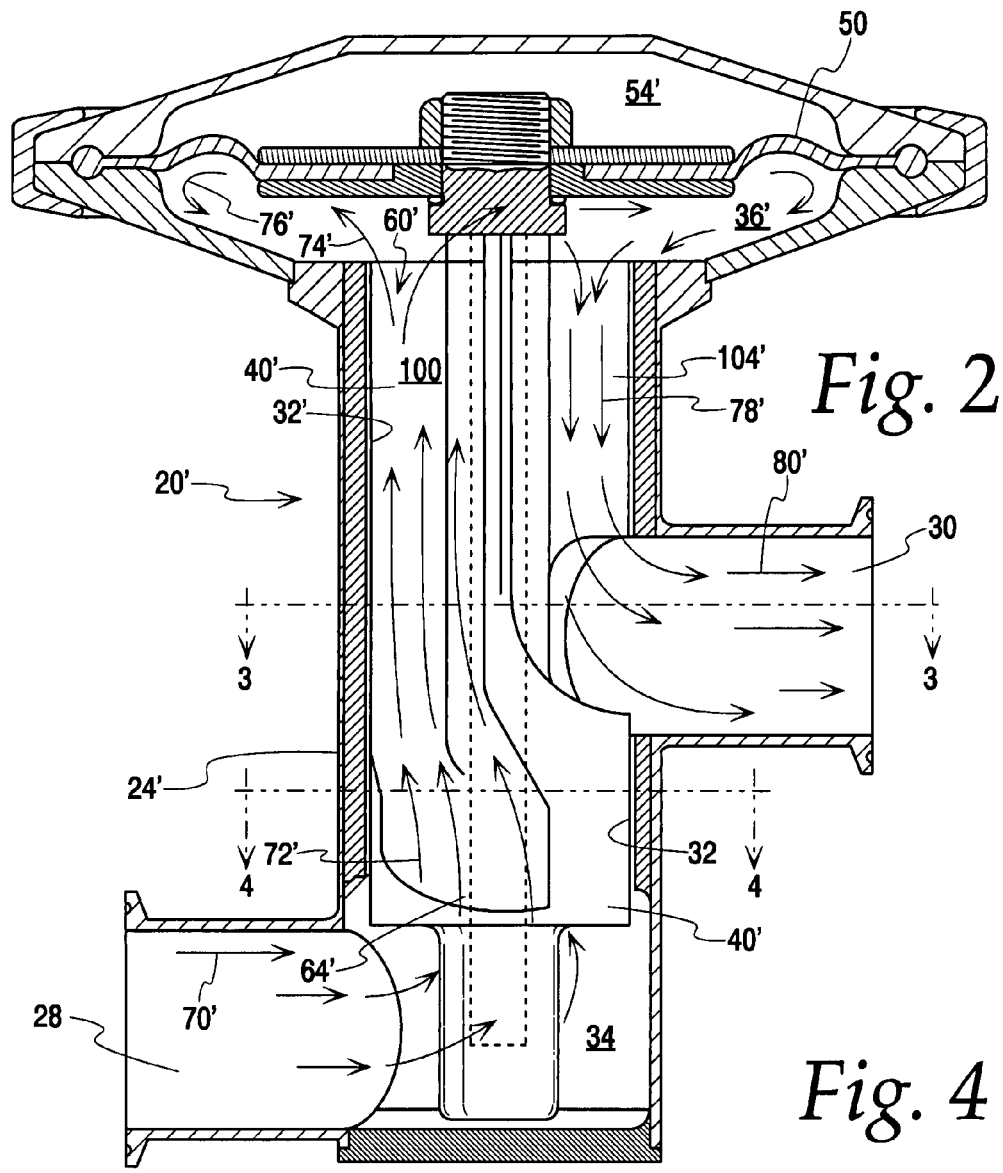
*Fig. 2*
*Fig. 4*
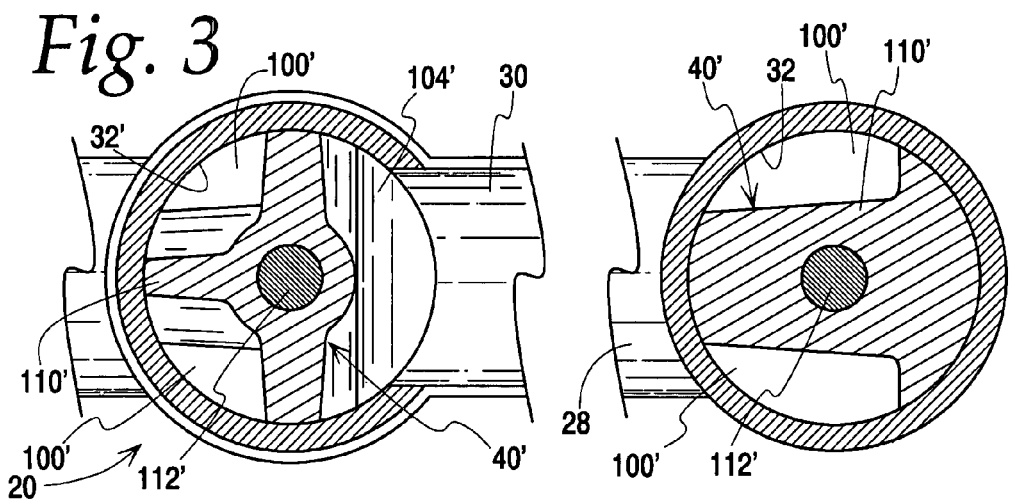
*Fig. 3*

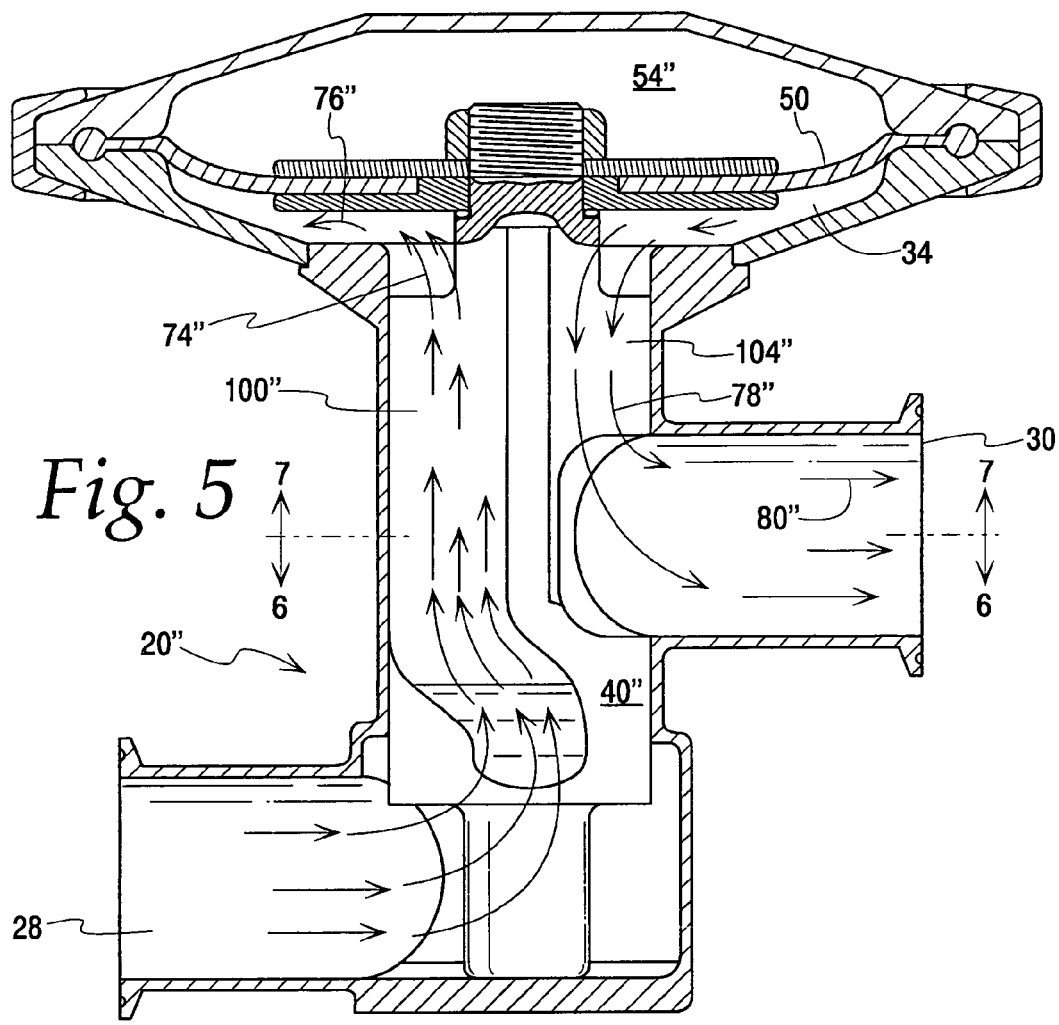
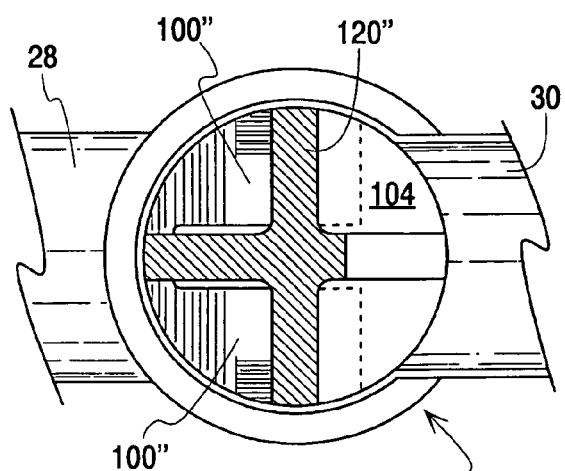 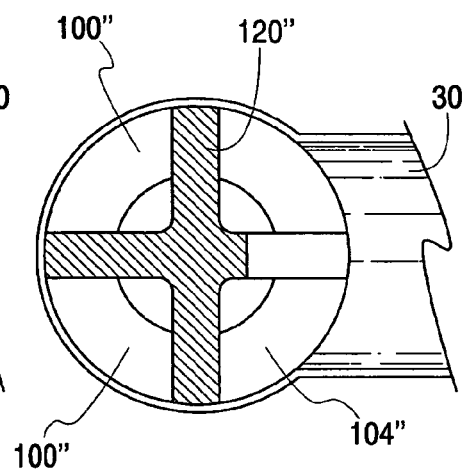

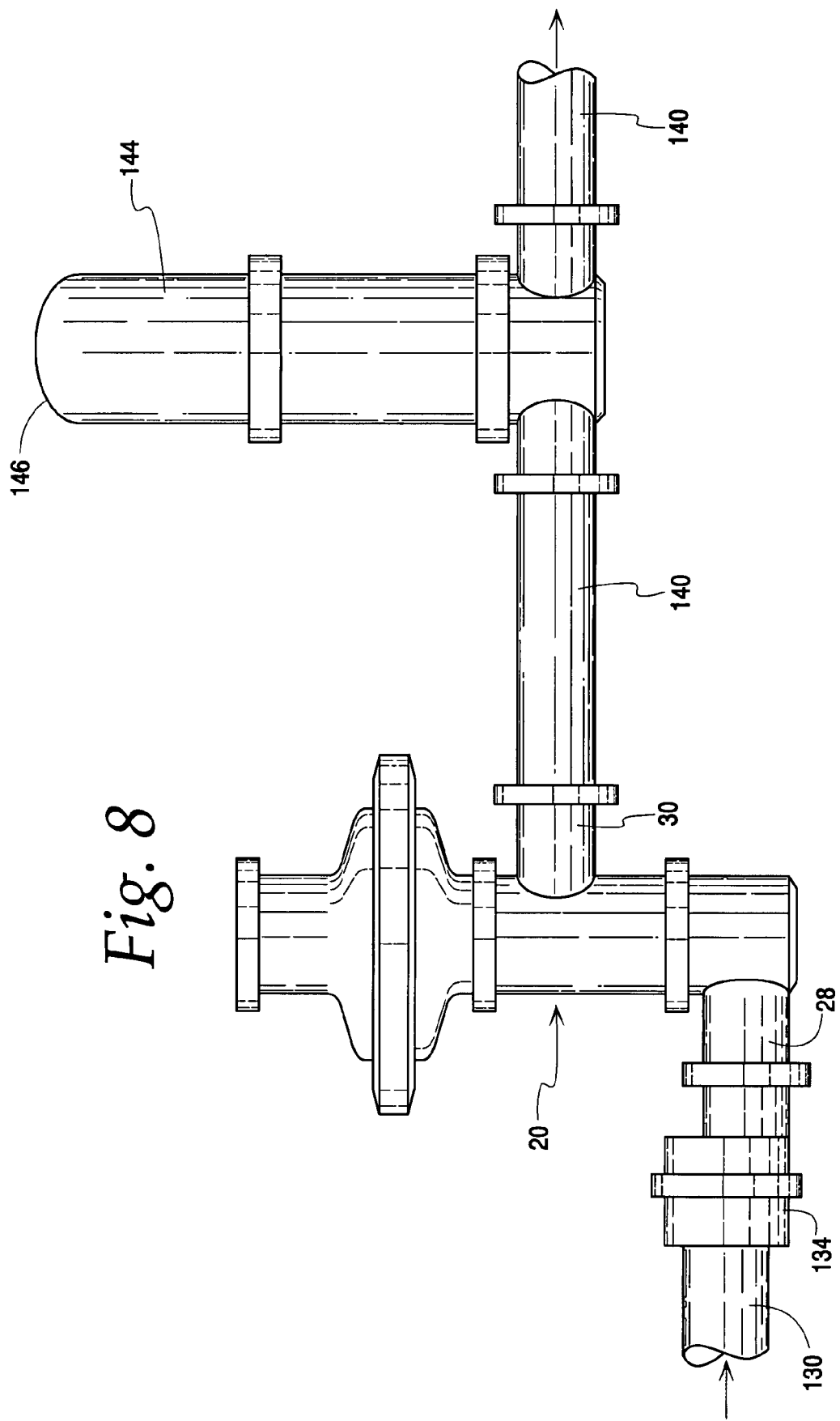

SANITARY FLUID PRESSURE CONTROL VALVE

CROSS REFERENCE TO RELATED APPLICATION(S)

Priority is claimed to U.S. Provisional Application Ser. No. 60/791,725, filed Apr. 13, 2006.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward pressure control valves, and particularly toward pressure control valves used with sanitary fluids.

BACKGROUND OF THE INVENTION AND TECHNICAL PROBLEMS POSED BY THE PRIOR ART

Pressure control valves are used in a variety of applications to maintain a selected output pressure under varying flow volumes. However, standard pressure control valves are not always readily usable in sanitary fluid applications, such as in dairies, where it is imperative to maintain sanitary conditions within the fluid paths and also important that the fluid paths be easily and reliably cleaned.

The inventor hereof has previously patented a number of improvements for fluid pumping operations in which sanitation is particularly important, including U.S. Pat. No. 5,603,826 ("Return pump system for use with clean-in-place system for use with vessels"), U.S. Pat. No. 5,398,733 ("Readily cleaned liquid transfer system"), U.S. Pat. No. 5,392,797 ("Single motive pump, clean-in-place system, for use with piping systems and with vessels"), U.S. Pat. No. 5,096,396 ("Rotary apparatus having passageways to clean seal chambers"), and U.S. Pat. No. 4,339,111 ("Clean in place diaphragm valve").

The present invention is directed toward providing similarly advantageous cleanable and sanitary pressure control valves for use in sanitary fluid operations.

SUMMARY OF THE INVENTION

According to one aspect of the present invention, a sanitary fluid pressure control valve is provided, including a valve body having an input side and a discharge side with a restricted chamber therebetween, and a reciprocable plug extending through the valve body restricted chamber with one plug end on the valve body input side and the other plug end on the valve body discharge side. A diaphragm is secured to the one plug end, and defines a pressure chamber adjacent the valve body discharge side. A fluid passage extending through the restricted chamber is defined in the plug, and has an outlet adjacent the diaphragm and an inlet spaced from the plug other end. The pressure in the pressure chamber relative to the pressure in the valve body discharge side substantially controls the position of the plug in the restricted chamber. In a first position of the plug, the fluid passage inlet is substantially blocked in the restricted chamber, and the plug is reciprocable from the first position to fluid flow positions in which the fluid passage inlet is variously exposed on the valve body input side.

In one form of this aspect of the present invention, the fluid passage extends through the interior of the plug, and the fluid passage inlet is tapered and extends through a side of the plug movable into the restricted chamber when the plug moves to the first position.

In another form of this aspect of the present invention, the valve body includes an outlet spaced from the diaphragm, wherein fluid flows from the inlet side through the fluid passages to an area adjacent the diaphragm and then along the outside of the plug to the valve body outlet.

In still another form of this aspect of the present invention, the fluid passage consists of at least one groove on the exterior of the plug, the fluid passage inlet is a tapered groove end spaced from the plug other end, and the plug cooperates with the valve body to close the fluid passage from its inlet to a diaphragm chamber adjacent the diaphragm. In a further form, the groove is tapered radially from the reciprocal axis of the plug. In another further form, the plug includes a metal core extending from the on end to the other end and an elastomer body is around the metal core, wherein the groove is defined in the elastomer body. In an alternate further form, the plug is metal including a substantially cylindrical section extending through the restricted chamber, and the grooves are milled longitudinal slots in the outer surface of the cylindrical section.

In yet another form of this aspect of the present invention, the pressure chamber includes pressurized gas and the sanitary fluid is liquid, with the diaphragm having a cross-sectional area substantially greater than the cross-sectional area of the plug.

In another form of this aspect of the present invention, a leakage clearance is around the plug from the input side through the restricted chamber to the discharge side.

In still another form of this aspect of the present invention, the plug inlet has a progressive taper producing a parabolic flow curve as the plug moves from the first position to a second position in which the fluid passage is fully open.

In yet another form of this aspect of the present invention, the restricted chamber is substantially cylindrical and the plug includes a substantially cylindrical section extending through the restricted chamber and reciprocable therein. In a further form, the fluid passage is a groove in the cylindrical section, and the restricted chamber extends from the inlet side to adjacent the diaphragm. In a still further form, a valve body outlet is spaced from the diaphragm, and a second groove in the plug cylindrical section extends from the plug other end to adjacent the body outlet.

BRIEF DESCRIPTION OF THE DRAWINGS

FIG. 2 is a cross-sectional view of a second embodiment of a pressure control valve according to the present invention;

FIG. 3 is a cross-sectional view taken along line 3-3 of FIG. 2;

FIG. 4 is a cross-sectional view taken along line 4-4 of FIG. 2;

FIG. 5 is a cross-sectional view of a third embodiment of a pressure control valve according to the present invention;

FIG. 6 is a cross-sectional view taken along line 6-6 of FIG. 5;

FIG. 7 is a cross-sectional view taken along line 7-7 of FIG. 5. and

FIG. 8 is an illustration of a fluid line incorporating a pressure control valve according to the present invention.

DETAILED DESCRIPTION OF THE INVENTION

Figure 1:
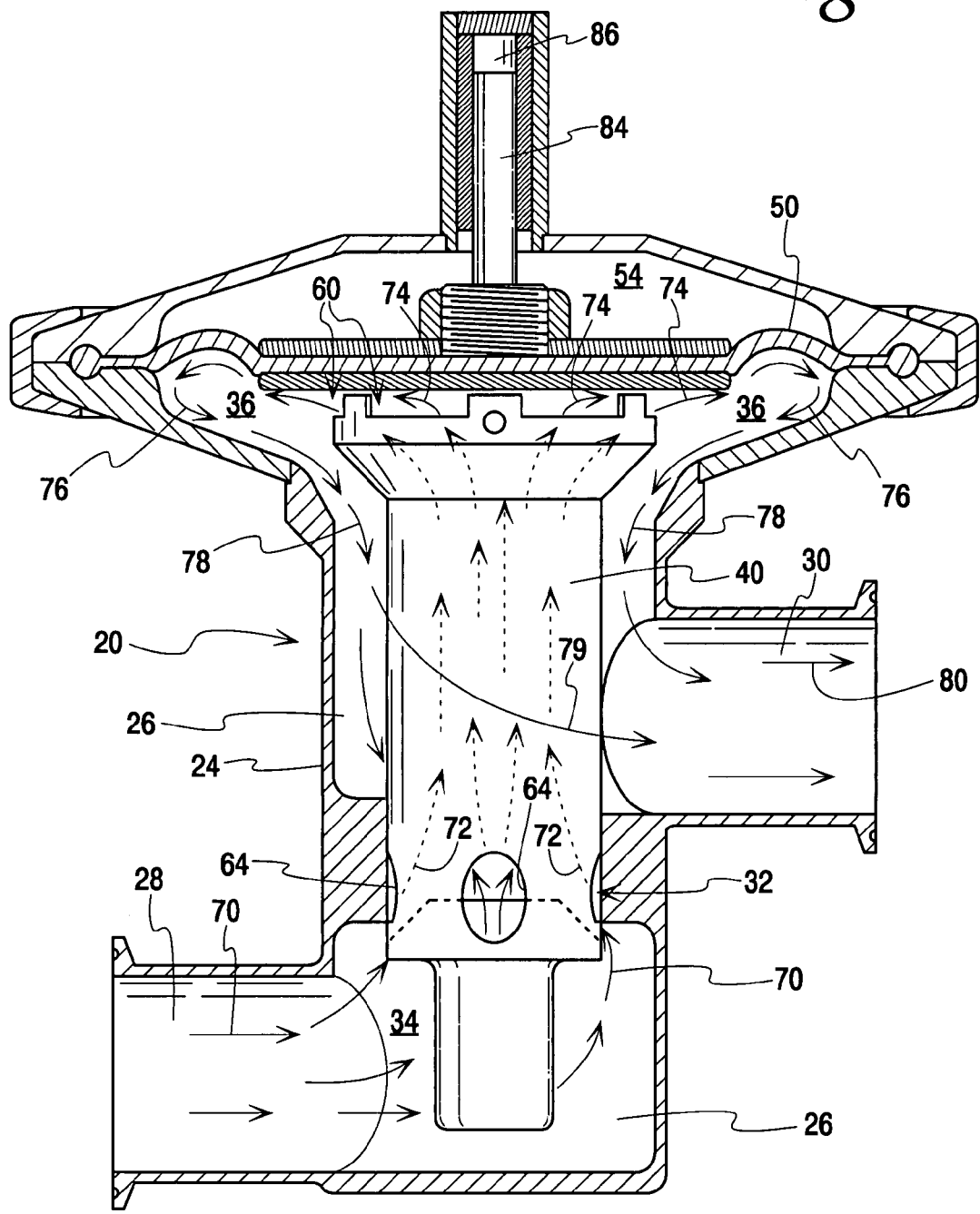
FIG. 1 is a cross-sectional view of a first embodiment of a pressure control valve according to the present invention.

In accordance with the present invention, a sanitary pressure control valve 20 is disclosed which uses a control pressure to maintain a selected output pressure under varying flow volumes, provided that the valve 20 is supplied by a source pressure higher than the controlled pressure. This may, for example, be used with a pump (such as a centrifugal pump having an output that can be restricted. The output pressure of the valve 20 is adjustable while operating by adjusting a balancing gas pressure, as detailed herein.

FIG. 1 illustrates a first embodiment of a pressure control valve 20 according to the present invention through which sanitary fluid may flow.

The valve 20 includes a valve body or housing 24 with an interior flow area 26 defined between an inlet 28 and a discharge outlet 30. The interior flow area 26 includes a restricted chamber 32 between an inlet side 34 and a discharge side 36. The restricted chamber 32 cooperates with a reciprocable throttling plug 40 to restrict flow of the sanitary fluid from the inlet 28 to the discharge outlet 30 as described in greater detail below.

A diaphragm 50 is suitably secured to the end of the plug 40 in the discharge side 36, with the diaphragm 50 also being suitably secured around its outer perimeter to the valve body 24 so as to define a pressure chamber 54 adjacent the discharge side 36. Gas at a selected pressure is provided in the pressure chamber 54 as described in further detail below. The diaphragm 50 has a cross-sectional area substantially greater than the cross-sectional area of the plug 40.

The plug 40 defines a fluid passage through the restricted chamber 32. Specifically, the plug 40 is substantially hollow so as to define a fluid passage through the interior of the plug 40. On the discharge side 36, the plug 40 includes outlets 60 which are adjacent the diaphragm 50, whereas the plug 40 is closed on the inlet side 34 but for inlets 64 on the outer side of the plug 40. The inlets 64 are positioned so as to be variably retained in the restricted chamber 32, depending on the reciprocal position of the plug 40, and the inlets 64 may also be advantageously tapered radially from the plug axis to provide a variable flow opening depending upon the position of the plug 40. Moreover, the plug inlets 64 may advantageously have a progressive taper producing a parabolic flow curve as the plug moves from its closes position (with the inlet 64 fully blocked in the restricted chamber 32) to a fully open position in which the tapered inlet 64 is fully open to the inlet side 34.

Thus, it should be appreciated that when the plug 40 is moved up as illustrated in FIG. 1, the inlets 64 will essentially be fully enclosed in the restricted chamber 32 so that sanitary fluid on the inlet side 34 will be substantially blocked from passing through the valve 20.

Further, when the plug 40 moves down toward the inlet side 34, the plug inlets 64 will gradually (increasingly) be exposed to the inlet side 34 to allow sanitary fluid to flow from the inlet side 34 (arrows 70) through the plug inlets 64 and plug interior (arrows 72), and then out the plug outlets 60 at the upper end of the plug 40 (arrows 74).

Fluid which flows out of the plug outlets 60 will first flow into the area of the discharge side 36 adjacent the diaphragm 50 (arrows 76). It should be appreciated that such flow will not only keep that area from being a stagnant, and potentially unsanitary, location, it will also facilitate the cleaning in place (CIP) of the valve 20 when cleaning fluid is circulated through the valve 20.

Fluid will finally flow from the area adjacent the diaphragm 50 down around the outside of the plug 40 (arrows 78) and then out of the valve discharge outlet 30 (arrows 80).

As previously noted, the plug 40 is reciprocable within the valve body 24, guided for such movement in part by the rod plug extension 84 received in a valve body cylindrical recess 86 above the pressure chamber 54 and further by the substantially cylindrical outer surface of the portion of the plug 40 which passes through the substantially cylindrical restricted chamber 32. (It should be appreciated that the plug 40 and restricted chamber 32 will generally match to substantially prevent leakage through the restricted chamber 32 around the outside of the plug 40, but that a leakage clearance may nonetheless be advantageously provided to permit some leakage through the restricted chamber 32 to the discharge side 36 to prevent excess pressure build up in the inlet side 34.

It should be appreciated that the gas pressure in the pressure chamber 54 will act upon the upper end of the plug 40 and the diaphragm 50 to control the movement and position of the plug 40 within the valve body 24. Specifically, the gas pressure in the pressure chamber 54 holds the plug 40 in the open position (i.e., down so that the plug inlets 64 are open to the valve body inlet side 34) until the fluid pressure in the discharge side 36 builds up to the point where it raises the plug 40. At that point (with built up fluid pressure in the valve body discharge side 36), as the plug 40 raises (toward the discharge side 36), the plug inlets 64 will be progressively blocked as they move into the restricted chamber 32 and thereby decrease the fluid flow until the pressure in the discharge side 36 balances with the pressure in the pressure chamber 54.

Gas pressure in the pressure chamber 54 may be adjusted to compensate for other forces in the valve 20 as well including, for example, the weight of the plug 40 when the valve 20 is oriented vertically such as in FIG. 1.

FIGS. 2-4 and 5-7 illustrate second and third embodiments, respectively, incorporating the present invention wherein the controlled fluid flow through the restricted chamber takes place through grooves on the outside of the plug. As will be appreciated by those skilled in the art once they have obtained an understanding of the present invention by the disclosure herein, many of the components in these embodiments are identical to components of the first described embodiment, or are corresponding modified components. Accordingly, as described herein, identical components are identified by the same reference numeral, and modified corresponding components are identified by the same reference number but with prime (e.g., 40') or double prime (e.g., 40") added (in the second and third embodiments, respectively).

Referring now specifically to the second embodiment illustrated in FIGS. 2-4, the valve 20' includes a valve body 24' with a restricted chamber 32' between an inlet side 34 and a discharge side 36'. The restricted chamber 32' cooperates with a reciprocable throttling plug 40' to restrict flow of the sanitary fluid from an inlet 28 to a discharge outlet 30 as described in greater detail below, with a diaphragm 50 suitably secured to the end of the plug 40' and around its outer perimeter to the valve body 24' so as to define a pressure chamber 54' adjacent the discharge side 36. Gas at a selected pressure is provided in the pressure chamber 54 as described in further detail below.

The plug 40' defines a fluid passage through the restricted chamber 32' by a pair of grooves 100' in the outside of the plug 40', extending from outlets 64' at the upper end of the plug 40' adjacent the diaphragm 50 to inlets 64' spaced from the bottom end of the plug 40'. The restricted chamber 32' extends alongside the grooves 100' to the discharge area 36' adjacent the diaphragm 50 to direct fluid flow according to arrows 70', 72', 74', 76', 78' and 80'.

As with the first described embodiment, the inlets 64' are positioned so as to be variably retained in the restricted chamber 32', depending on the reciprocal position of the plug 40', and the inlets 64' may also be advantageously tapered to provide a variable flow opening depending upon the position of the plug 40'. As contrasted with the first embodiment, however, the fluid flow from adjacent the diaphragm 50 does not occur around the entirety of the plug 40', but instead occurs through a groove 104' in the plug 40' extending from the from the upper end of the plug 40' adjacent the diaphragm 50 to the discharge outlet 30.

Operation of the valve 20' is as previously described, with the discharge line pressure controlled by the setting of the pressure in the pressure chamber 54'.

As best seen in FIGS. 3-4, the plug 40' of the second embodiment may be formed of a suitable material 110', such as an elastomer, molded around a metal axial core 112'. Moreover, the plug 40' may be readily designed with mold removal relief so as to allow the plug 40' to be molded with a two section mold.

FIGS. 5-7 illustrate a third embodiment substantially the same as the FIGS. 2-4 embodiment, except that the plug 40" is formed of machined metal 120", for example, with the grooves 100", 104" formed by milling.

FIG. 8 illustrates an exemplary use of a valve 20 such as described herein (reference numerals from the first embodiment shown in FIG. 1 are used for convenience; it should be understood that any of the described valves 20, 20', 20" could be used as described). A first line 130 receiving fluid flow from a suitable pump is connected, through a check valve 134, to the valve inlet 28. The discharge outlet 30 is connected to a line 140 through which the fluid may be supplied to the intended use. An accumulator 144 may be advantageously provided in the line 140.

Leakage flow through the restricted chamber 32 as previously described may build up pressure in the stabilizing accumulator 144 to an over pressure set point of a suitable switch 146 activated by the pressure of the gas in the accumulator 144. When over pressure shuts down the supply pump, the line pressure is held stable by the check valve 134, with the supply pump remaining off until product use lowers the line pressure. This line pressure drop lowers the pressure in the accumulator 144, until the pressure is sufficiently low to cause the switch 146 to restart the supply pump.

It should thus be appreciated that the supply pump may continue to run as long as there is demand and, under normal product use operating conditions, the line pressure will be held very close to the set point. With interruptions of use, the line pressure will be held within a safe operating range.

It should thus also be appreciated that the sanitary pressure control valve 20 may be used to maintain a selected output pressure under varying flow volumes, provided the valve 20 is supplied by a source pressure higher than the controlled pressure. The pump (such as a centrifugal pump) may advantageously have an output that can be restricted. The output pressure of the valve 20 is adjustable while operating, by adjusting the balancing gas pressure.

Valve output pressure may be selected by adjusting the gas pressure loading the pressure chamber 54 side of the diaphragm 50, or mechanically adjusting spring pressure to balance product fluid pressure on the operator diaphragm 50. By using a diaphragm 50 several times larger than the valve plug 40, close pressure control is possible over a wide range of operating conditions. Control of discharge pressure can be closely maintained even with changes in the supply pressure.

Further, cleaning of sanitary equipment without disassembly (CIP), which is essential to consistent sanitation and practical plant operation in many applications, may be effectively achieved with this valve 20 by circulation with standard CIP procedures by directing the full flow of the valve 20 through all wetted areas before discharging from the valve 20. This eliminates dead end pockets that trap soil beyond the effective flow of the circulating CIP cleaning solution, thereby allowing effective cleaning in place without disassembly.

Moreover, optimum performance may be advantageously achieved with the valve 20 by providing that the plug 40 is parabolic in output so as to provide close pressure control through a wide range of flow volume.

Still further, should all use be shut down and the valve 20 be closed, small leakage around the plug 40 as previously described may advantageously prevent total stopping of fluid flow that would overheat the fluid in a centrifugal pump.

Still other aspects, objects, and advantages of the present invention can be obtained from a study of the specification, the drawings, and the appended claims. It should be understood, however, that the present invention could be used in alternate forms where, less than all of the objects and advantages of the present invention and preferred embodiment as described above would be obtained.

The invention claimed is:

1. A sanitary fluid pressure control valve, comprising
   a valve body having art input side and a discharge side with a restricted chamber therebetween;
   a reciprocable plug extending through said valve body restricted chamber with one plug end on said valve body input side and the other plug end on the valve body discharge side;
   a diaphragm secured to said one plug end, said diaphragm defining a pressure chamber adjacent said valve body discharge side;
   a restricted fluid passage through said restricted chamber defined by said plug, said fluid passage having an outlet directly adjacent said diaphragm to direct fluid flow to strike said diaphragm and an inlet spaced from said plug other end;
   wherein
   the pressure in said pressure chamber relative to the pressure in said valve body discharge side substantially controls the position of said plug in said restricted chamber,
   in a first position of said plug, said fluid passage inlet is substantially blocked in said restricted chamber,
   said plug is reciprocable from said first position to fluid flow positions in which said fluid passage inlet is variously exposed on said valve body input side,
   the valve body includes an outlet spaced from said diaphragm, wherein fluid flows from said inlet side through said fluid passages to an area adjacent said diaphragm and then along the outside of said plug to said valve body outlet, and
   said fluid passage extends through the interior of said plug, and said fluid passage inlet is tapered and extends through a side of said plug movable into said restricted chamber when said plug moves to said first position.

2. The valve of claim 1, wherein said pressure chamber includes pressurized gas and said sanitary fluid is liquid and said diaphragm has a cross-sectional area substantially greater than the cross-sectional area of said plug.

3. The valve of claim 1, further comprising a leakage clearance around said plug from said input side through said restricted chamber to said discharge side.

4. A sanitary fluid pressure control valve, comprising
a valve body having an input side and a discharge side with a restricted chamber therebetween;
a reciprocable plug extending through said valve body restricted chamber with one plug end on said valve body input side and the other plug end on the valve body discharge side;
a diaphragm secured to said one plug end, said diaphragm defining a pressure chamber adjacent said valve body discharge side;
a fluid passage through said restricted chamber defined in said plug, said fluid passage having an outlet adjacent said diaphragm and an inlet spaced from said plug other end;

wherein
the pressure in said pressure chamber relative to the pressure in said valve body discharge side substantially controls the position of said plug in said restricted chamber,
in a first position of said plug, said fluid passage inlet is substantially blocked in said restricted chamber,
said plug is reciprocable from said first position to fluid flow positions in which said fluid passage inlet is variously exposed on said valve body input side, and
said plug inlet has a progressive taper producing a parabolic flow curve as the plug moves from the first position to a second position in which the fluid passage is fully open.

* * * * *